United States Patent [19]

Salamone

[11] Patent Number: 5,684,059
[45] Date of Patent: *Nov. 4, 1997

[54] FLUORINE CONTAINING SOFT CONTACT LENS HYDROGELS

[76] Inventor: Joseph C. Salamone, 7075 Queen Ferry Cir., Boca Raton, Fla. 33496

[*] Notice: The term of this patent shall not extend beyond the expiration date of Pat. No. 4,990,582.

[21] Appl. No.: 404,124

[22] Filed: Mar. 13, 1995

Related U.S. Application Data

[63] Continuation of Ser. No. 930,755, Aug. 14, 1992, abandoned, which is a continuation of Ser. No. 619,171, Nov. 27, 1990, abandoned, which is a continuation of Ser. No. 22,270, Mar. 5, 1987, Pat. No. 4,990,582, Continuation-in-part of Ser. No. 888,047, Jul. 18, 1986, abandoned.

[51] Int. Cl.$^6$ ........................................... C08J 3/24
[52] U.S. Cl. ........................................... 523/107; 526/245
[58] Field of Search ........................... 523/107; 526/245

[56] References Cited

U.S. PATENT DOCUMENTS

| | | |
|---|---|---|
| 3,929,741 | 12/1975 | Laskey . |
| 4,130,706 | 12/1978 | Plambeck, Jr. . |
| 4,163,609 | 8/1979 | Neefe . |
| 4,327,202 | 4/1982 | Foley, Jr. . |
| 4,343,927 | 8/1982 | Chang . |
| 4,433,111 | 2/1984 | Tighe et al. .......................... 525/326.3 |
| 4,440,918 | 4/1984 | Rice et al. . |
| 4,602,074 | 7/1986 | Mizutani et al. .......................... 526/245 |
| 4,650,843 | 3/1987 | Yokoyama et al. . |
| 4,990,582 | 2/1991 | Salamone .................................. 526/245 |
| 5,387,662 | 2/1995 | Kunzler et al. .......................... 523/107 |
| 5,451,617 | 9/1995 | Lai et al. .................................. 523/107 |

FOREIGN PATENT DOCUMENTS

| | | |
|---|---|---|
| 0017512 | 4/1972 | European Pat. Off. . |
| 0050934 | 5/1982 | European Pat. Off. . |
| 0100381 | 12/1984 | European Pat. Off. . |
| 2091417 | 1/1972 | France . |
| 59214822 | 12/1984 | Japan . |
| 1566249 | 4/1980 | United Kingdom . |
| 2171106 | 8/1986 | United Kingdom . |

Primary Examiner—Thurman K. Page
Assistant Examiner—P. Kulkosky

[57] ABSTRACT

An improved soft contact lens material, existing as a hydrogel, is formed by a polymer containing a fluorinated monomer, a hydroxyalkyl ester of acrylic or methacrylic acid, and an N-vinyl lactam. The polymer may also contain other hydrophilic and/or hard hydrophobic monomers, crosslinking agents, and uv-absorbing agents. Contact lenses made of these combinations have high water of hydrations, are highly wettable, have extremely high oxygen permeabilities and are resistant to protein deposits and other forms of attached debris.

28 Claims, No Drawings

FLUORINE CONTAINING SOFT CONTACT LENS HYDROGELS

This application is a continuation of application Ser. No. 07/930,755, filed on Aug. 14, 1992 abandoned, which in turn is a continuation of application Ser. No. 07/619,171, filed on Nov. 27, 1990 abandoned, which in turn is a continuation of application Ser. No. 07/022,270, filed on Mar. 5, 1987, (now U.S. Pat. No. 4,990,582, issued Feb. 5, 1991) which in turn is a continuation-in-part of application Ser. No. 06/888,047, filed on Jul. 18, 1986 abandoned.

BACKGROUND OF THE INVENTION

In the field of daily wear contact lenses, two general areas of contact lens materials are known, namely "soft" and "hard" lenses. The conventional soft lenses are primarily hydrogels derived from a variety of hydrophilic monomers or polymers which have either been crosslinked or insolubilized in water by some other mechanism, such as by introduction of crystallinity or by varying hydrophobic/ hydrophilic properties. They normally contain approximately 38% water with a Dk value of 8–12 ($\times 10^{-11}$ cm$^2$/sec) (ml O$_2$/ml mmHg) at 35° C. Another form of a "soft" lens is a hydrophobic polymer system which is above its glass transition temperature, such as a silicone elastomer. Such materials can have a high Dk value, but generally have a much poorer drape than hydrogel lenses.

"Hard" lenses, these were initially prepared from polymethyl methacrylate, but such systems lacked sufficient oxygen permeability to provide adequate oxygen levels to the cornea. Because of this difficulty, hard oxygen-permeable contact lens materials were introduced. Such materials have been prepared from either siloxanyl alkyl methacrylates or fluoromethacrylates, usually in copolymerization with other monomers to improve hardness, refractive index, and wettability.

A major area in vision care has been the introduction of extended wear contact lenses. These systems have been prepared from traditional type hydrogels, usually with water contents in the area of 70% and Dk values of approximately 40 at 35° C., or from hard gas permeable materials with Dk values of 25 and greater. For both systems several difficulties have been encountered. Traditional extended wear hydrogel lenses can have extensive deposit formation on the lens surfaces by denatured proteins, mucopolysaccharides, lipids, phospholipids, cholesterol, insolubilized calcium salts, etc. This effect appears greater than that of traditional daily wear soft lenses, which have a lower water of hydration. In addition, to achieve a high oxygen transmisibility (Dk/L), such lenses could be made thin, an effect which markedly reduces their tear strength. Thus, if an extended wear soft lens becomes covered with surface deposits it must be removed and cleaned in order to improve visual acuity. In so doing, however, if the lens deposits are capable of being removed, the weak character of the hydrogel could lead to a torn lens. In addition, oftentimes with extended wear soft lenses it is also not possible to remove the adhered deposits without pitting the lens surface.

The extended wear hard gas permeable lenses normally provide greater visual acuity than hydrogel lenses, with a far greater rigidity to the lens material. However, such hard lenses do not have the inherent comfort of a soft hydrogel lens and they also can develop marked surface deposits with time unless properly cleaned.

In order to either increase the oxygen permeability, or in certain cases to overcome the difficulty of surface deposit formation in hydrogel contact lenses, some attempts have been made to include fluorine-containing monomers in the polymerization to form the lens materials. U.S. Pat. No. 3,808,179 teaches that certain hard gas permeable contact lens materials containing a fluoroalkyl acrylate or methacrylate can be made inherently wettable. U.S. Pat. No. 3,542,461 teaches that solid oxygen permeable lenses of various fluoropolymers can be prepared that have indices of refraction similar to human tears. U.S. Pat. No. 3,940,207 teaches that soft, tough fluorine-containing contact lenses can be made, after surface treatment, which are wettable and have low oxygen permeability. U.S. Pat. No. 3,950,315 teaches that contact lenses containing less than 5% water can be made from a copolymer of methyl methacrylate and a fluoroester, said lens materials have a Dk of 2.5 (2,500 centibarrers). U.S. Pat. No. 4,433,111 teaches that a hydrogel polymer containing 5 to 10 mole % fluorine-containing monomer or precursor and another hydrophobic monomer has the ability to increase the protein repellency of the lens material in the presence of artificial tear fluid, with Dk values between 40–80 at 34° C. However, use of hydrophobic comonomers can in some cases decrease Dk value and/or hydration or other properties. Compatibility problems can also occur. In a material disclosed by U.S. Pat. No. 4,130,706, it was shown that copolymers of acrylates and methacrylates containing at least one polar group could be copolymerized with a straight chain fluoroacrylate or methacrylate in solution. While such hydrogel materials showed some oxygen permeability, where the Dk values of these materials were 5–30 (or 500–3000 centibarrers, with the upper value being the permeability of the unmodified fluoropolymer), the patent does not disclose preparation in bulk form probably because of the incompatibility of the two monomer systems. Accordingly, lenses would thus be difficult to obtain from their resulting solution cast films, as opposed to bulk polymerization which is used for the preparation of machineable rods or buttons, or of cast-molded lenses. The copolymers prepared also had limited water contents of less than 40%. In U.S. Pat. No. 4,440,918, telechelic perfluorinated polyethers in elastomeric to hard gas permeable contact lenses have also demonstrated resistance to surface deposits by proteins and lipids. In a further example, U.S. Pat. No. 4,433,125 teaches that an organosilane or an organosiloxane can be copolymerized with a fluoroacrylate or a methacrylate to give hard contact lenses with improved oxygen permeability. International Pat. No. WO 82103397 describes the preparation of oxygen permeable hydrogel contact lenses from silicone methacrylate and pentafluorostyrene and N-vinylpyrrolidone. However, no previous examples have demonstrated a high oxygen permeability, a high water of hydration and a high resistance to surface deposits in contact lens materials which can be obtained through a bulk polymerization reaction and utilized in a hydrogel form for either daily wear or extended wear applications.

SUMMARY OF THE INVENTION

It is a primary object of this invention to provide novel hydrogel contact lens materials which are prepared from a combination of monomers so as to have high oxygen permeability.

It is another object of this invention to provide hydrogel contact lens material that resist surface deposit formation through adhered debris.

It is a further object of this invention to provide a hydrogel contact lens that has a higher tear strength than conventional hydrogels at the same levels of water of hydration.

It is an additional object of this invention to provide a hydrogel contact lens that absorbs uv radiation.

According to the invention a hydrogel contact lens material is made from copolymerizing (a) from 0.1 wt. % to 40 wt. % of a linear, branched, cyclic or bicyclic fluorine-containing monomer with (b) 2–85 wt. % of mono- or di-hydroxy alkyl ester or an alkylene oxide ester, of acrylic or methacrylic acid, and (c) 5–80 wt. % of an N-vinyl lactam. Preferably one or more of the following monomers are further copolymerized with (a), (b) and (c); (d) 0–60% of other hydrophilic monomers, (e) 0–7% of a crosslinking agent and (f) 0–2 wt. % of a uv absorbing monomer or polymer, Polymerization is either conducted by free radical initiation, by uv, x-ray, y-ray, electron beam or microwave polymerization. Preferably, polymerization is carried out in bulk using a free radical initiator in a temperature range of 35° C. to 90° C. Such polymerizations may also be conducted in a solvent such as glycerol. The Dk of the material is preferably at least 35 (x$10^{-11}$ cm$^2$/sec) (ml O$_2$/ml mmHg) at 35° C. and the material has a water of hydration of at least 30 weight percent.

It is a feature of this invention that compatible, clear bulk copolymers result. The fluoromonomer (a) provides enhanced oxygen solubility to the hydrogel and the hydroxy-alkyl ester of acrylic or methacrylic acid (b) provides wettability and integrity to the gel network. The addition of the N-vinyl lactam (c) to (a) and (b) is critical to obtain clear bulk copolymers without any haze or opacity. Without the presence of (c), optically clear bulk polymers do not result. In addition, (c) also provides for wettability greater than that from utilizing only (b) in conjunction with (a). Thus, it is believed that (c) is a compatibility increasing agent or solubilizing monomer capable of causing phase domain size of the hydrophobic moiety smaller than the wave length of light and this gives optical clarity.

Since the water of hydration (based upon the wet weight of the sample) is often moderate (ca. 40%) when components (a), (b), and (c) are utilized, it is often preferred to further increase the wetting by addition of other hydrophilic monomers. In improving the wetting ability other hydrophilic systems (d) containing —NH$_2$, —SO$_3^-$, —COOH, —PO$_3$H, —N$^+$(CH$_3$)$_3$, —(CH$_2$CH$_2$O)$_x$R (where x=1–100 and R=H or CH$_3$), and —OH groups can be added such that the water of hydration could approach 93% of the total weight of the material.

When the amount of crosslinking (e) is 0%, maximum swelling of the hydrogel is achieved. Since this lens system is composed of hydrophobic ingredients [(a)] and hydrophilic ingredients [(b), (c), (d)], a crosslinker is not required as the system cannot dissolve in water. The optically clear domains caused by the pendant fluorosubstituents appear to increase the tear strength of the gel above that of a related hydrogel at the same water content but without the fluoromonomer monomer. However, if it is desirable to further increase the strength of the hydrogel, small amounts of a crosslinking agent can be added.

Should a uv-absorbing hydrogel contact lens be required (f), such as for aphakic extended-wear patients, a uv-absorbing monomer or polymer can be incorporated into the formulation such that uv absorption in the range of 300–410 nm is obtained.

DESCRIPTION OF THE PREFERRED EMBODIMENTS

The novel copolymers preferably have from 0.1 to 40 wt. % of a linear, branched, cyclic or bicyclic fluorine-containing monomer with best results obtained with 10 to 25 wt. % of (a). The fluoromonomers useful in this invention have the following structures:

Fluoroacrylates and Fluoromethacrylates

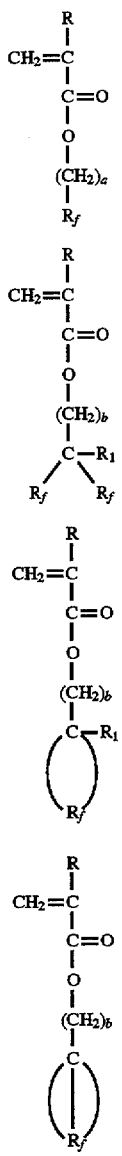

Where R is selected from the class of hydrogen, methyl, fluoro and trifluoromethyl groups, "a" is an integer from 1–4, "b" is an integer from 0–4, R$_1$ is selected from the class of hydrogen, methyl and trifluoromethyl groups, and R$_f$ is a straight or branched fluoroalkyl group preferably having from 1–18 carbon atoms, fluoroaryl group, or fluoroarylene group having 1–24 fluorine atoms.

Fluorostyrenes

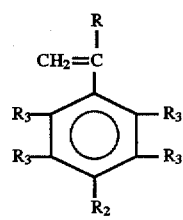

-continued

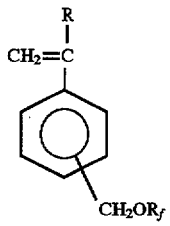

Where R and $R_f$ are as designated above, $R_2$ is selected from the class of fluoro or $R_f$ groups, and $R_3$ is selected from the class of hydrogen or fluoro groups.

Fluoro Macromonomers

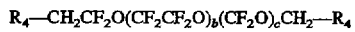

Where "b" and "c" are integers from 1 to 150, and $R_4$ is a substituent containing a polymerizable double bond. When fluoro macromonomers are used, they can be used in combination with conventional low molecular weight fluoromonomers to improve compatibilization. The macromonomers, if used, are preferably used at the low end of the 0.1 to 40% range and most preferably about 1 to about 5% by weight.

Fluorosulfonamides

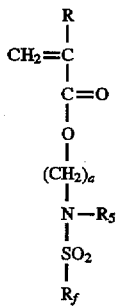

Where R, $R_f$ are designated as above, and $R_5$ is selected from the class of hydrogen, alkyl or aryl substituents.

In addition to the above, it is also possible to use fluorinated itaconate esters. The fluoromonomers can either be used individually or in combination, with the fluoromethacrylates and the fluorostyrenes being the preferred materials.

The hydroxyalkyl esters of acrylic and methacrylic acid, which are of use, are preferably derived from 2-hydroxyethyl acrylate and methacrylate, 2,3-dihydroxypropyl acrylate and methacrylate, 2-hydroxypropyl acrylate and methacrylate. These materials can be used in conjunction with an alkylene oxide such as hydroxy or methoxy-terminated polyethylene glycol monoacrylate and monomethacrylate (macromers). Such alkylene oxide acrylates or alkylene oxide methacrylates can be used without the above-noted hydroxyalkyl esters so long as optical clarity is maintained. 2-Hydroxyethyl methacrylate being the preferred material in concentration of 2-85 wt. %, and preferably between 10-35%.

For the N-vinyl lactam, the preferred compound is N-vinylpyrrolidone, although other substituted vinylamides can be employed. It is important that this class of molecule be present, in concentrations from 5-80 wt. %, and preferably from 40-60 wt. %, in order to allow for compatibility and optical clarity for bulk polymerized formulations which include a fluoromonomer and a hydroxyalkyl ester. Outside of these limits it is usually difficult to obtain optically clear materials when the polymerization is conducted in the absence of solvent.

Normally 2-hydroxyethyl methacrylate contains a small amount of the crosslinking agent ethylene glycol dimethacrylate. When this concentration is minimal, maximum swelling of the hydrogel is obtained in aqueous solution. However, such gels may have an inherently weak structure which allows facile rupturing or tearing. In such circumstances, an additional crosslinking agent can be employed, in concentrations of from 0-7 wt. %, and preferably from 0.1 to 2.0 wt. %. Examples of crosslinking agents include polyfunctional derivatives of acrylic acid, methacrylic acid, acrylamide, methacrylamide and multivinyl substituted benzenes, including but not limited to the following: ethylene glycol diacrylate or dimethacrylate, diethylene glycol diacrylate or dimethacrylate, triethylene glycol diacrylate or dimethacrylate, tetraethylene glycol diacrylate or dimethacrylate, polyethylene glycol diacrylate or dimethacrylate, trimethylolpropane triacrylate or trimethacrylate, Bisphenol A diacrylate or dimethacrylate, ethoxylated Bisphenol A diacrylate or dimethacrylate, pentaerythritol tri- and tetraacrylate and methacrylate, tetramethylenediacrylate or dimethacrylate, methylenebisacrylamide or methacrylamide, hexamethylene bisacrylamide or methacrylamide, divinyl benzene, diallyl itaconate, allyl methacrylate, diallyl phthalate, polysiloxanylbisalkyl acrylates and methacrylates, polysiloxanylbisalkylglycerol acrylates and methacrylates.

The additional hydrophilic monomers useful in the present invention include acrylic and methacrylic acid, acrylamide, methacrylamide, N,N-dimethylacrylamide, N,N-dimethylmethacrylamide, diacetone acrylamide, 2-acrylamido-2-methylpropanesulfonic acid and its salts, vinylsulfonic acid and its salts, styrenesulfonic acid and its salts, 2-methacryloyloxyethyl sulfonic acid and its salts, 3-methacryloyloxypropyl sulfonic acid and its salts, allylsulfonic acid, 2-phosphatoethyl methacrylate, di-tri-, tetra-, penta-... polyethyleneglycol monoacrylate or methacrylate, N,N-dimethylaminoethyl acrylate and methacrylate, 2-methacryloyloxyethyltrimethylammonium salts, 2-, 4- and 2-methyl-5-vinylpyridine and their quaternary salts, N-(3-methacrylamidopropyl) —N,N-dimethylamine, N-(3-methacrylamidopropyl) —N,N,N-trimethylammonium salts, 1-vinyl- and 2-methyl-1-vinylimidazole and their quaternary salts, N-(3-acrylamido-3-methylbutyl) —N,N-dimethylamine and its quaternary salts, N-(3-methacryloyloxy-2-hydroxypropyl) —N,N,N-trimethylammonium salts and diallyldimethylammonium salts. The triethanolammonium salt of 2-methacryloyloxyethane sulfonic acid is the preferred wetting agent.

A uv absorbing material can be added to the above mixture of monomers if it is desired to reduce or eliminate uv radiation in the wavelength of 300–410 nm. Of particular interest are the benzophenone and benzotriazole families, such as 2,2'-dihydroxy-4-methacryloyloxybenzophenone, 2,2'-dihydroxy-4,4'-dimethacryloyloxybenzophenone, 2-hydroxy-4-(3-methacryloyloxy-2-hydroxypropoxy) benzophenone, 2,2'-dihydroxy-4,4'-(3-bismethacryloyloxy-2-hydroxypropoxy) benzophenone, 1-, 4-, 5-, 6-, or 7-vinylbenzotriazole 4-, 5-, 6-, or 7-methacryloylorybenzotriazole, 1-methacryloylbenzotriazole, 4-, 5-, 6-, or 7-methacryloyloxy-2-hydroxypropoxybenzotriazole and 1-(methacryloyloxy-2-hydroxypropoxy)benzotriazole.

The copolymers described in this invention are preferentially prepared by radical polymerization utilizing a free radical initiator. The initiators are preferably either azo or peroxide families. Typical initiators include: 2,2'-azobis (2,4-dimethylpentanenitrile)(VAZO 52), 2,2'-azobisisobutyronitrile, 4,4'-azobis (4-cyanopentanoic acid), 2,2'-azobis (2-methylbutanenitrile), 2,2'-azobis(2,4-dimethyl-4-methoxyvaleronitrile), t-butyl peroctoate, benzoyl peroxide, lauroyl peroxide, methyl ethyl ketone peroxide, 2,4-dichlorobenzoyl peroxide, p-chlorobenzoyl peroxide, and diisopropyl peroxycarbonate and 2,5-dimethyl—2,5-di(2-ethylhexanoylperoxy) hexane.

Typically, the monomer solutions containing 0.1 to 0.5 wt. % initiator are flushed with either nitrogen or argon gas for two hours at room temperature. The samples, which are in plastic cups, plastic or glass tubes, are then heated at 35° C. for 24 hours, 50° C. for three hours, 70° C. for one hour and 90° C. for three hours. After this cycle is completed, the samples are cooled and the resulting polymer is removed from its vessel. If the vessel is a cast molding device, contact lenses can be prepared directly as in spin casting. Otherwise, the material is prepared in button, rod, or disc form, or other desired shapes, which can then be machined.

The resulting lenses are then hydrated in an isotonic buffered solution for one to two days at 35° C. prior to use. Depending on the ratio of fluoromonomer to hydroxyalkyl methacrylate to N-vinylpyrrolidone, either optically clear, hazy, or opaque polymeric materials are obtained. Under certain ratios, as described herein, optically clear, hard, machineable materials can be prepared.

After the finished polymerized shaped article is immersed in water or in buffered isotonic saline solution, a hydrogel results, usually within 1 to 7 days. The hydrogels absorb between 30 wt. % to 93 wt. % of buffered isotonic saline solution. Such materials can have Dk values at 35° C. ranging from 9 to 83. These oxygen permeabilities are, in some instances, higher than known values for all previously reported hydrogel soft contact lens materials. In addition to the high level of water contents and the exceptionally high oxygen permeabilities of the hydrogels, it has also been found that these fluorine-containing hydrogel materials display significant protein and lipid repellency properties. Thus, these combined properties provide a novel material for the preparation of soft, hydrogel contact lenses. Furthermore, these hydrogels have application in other biological materials such as surgical implants, prosthetic devices, heart valves, hydrophilic catheter coverings, hydrophilic vascular grafts and hydrophilic burn dressings.

The following examples are given to illustrate the invention and are not meant to be limiting:

EXAMPLES

GENERAL PROCEDURE

The desired materials for fluorine-containing hydrogel lenses are obtained by mixing the desired monomers and initiator, filtering the homogeneous comonomer solution, and pouring said solution into previously dried reaction vessels. The vessels are then placed in a heating block or bath and flushed with argon for a period of 5 minutes, after which the vessels are heated at 35° C. for 24 hours, 50° C. for three hours, 70° C. for one hour and 90° C. for three hours. Following the completion of the heating cycle, the heating block is cooled to room temperature and the vessels are removed. The resulting buttons or rods are then removed from their respective vessels.

The buttons are then cut into discs to determine water uptake by soaking in an isotonic buffered solution at pH 7.3 at 35° C. for at least 100 hours or until maximum swelling has occurred. The water contents were determined based on the disc's dry weight and wet weight by the following relationships: % of water of hydration (wet)=

$$\% \text{ of water of hydration (wet)} = \frac{\text{wt. of wet disc} - \text{wt. of dry disc}}{\text{wt. of wet disc}} \times 100$$

$$\% \text{ of water of hydration (dry)} = \frac{\text{wt. of wet disc} - \text{wt. of dry disc}}{\text{wt. of dry disc}} \times 100$$

The % of water of hydration based on the dry disc is determined after drying the hydrated disc at 50° C. under vacuum overnight.

In determining oxygen permeability (Dk), the following procedure was utilized: The hydrogel sample is covered on the tip of polarographic oxygen sensor and placed in buffer (pH 7.3) solution at 35° C. A steady state is reached when the oxygen between the sample and sensor tip is exhausted and then the rate of oxygen diffusing through the sample becomes a constant. The constant rate of oxygen passing through is measured by an oxygen sensing electrode and converted to current, which is the equilibrium point from the plot of current vs. time. The equilibrium current values were determined for different samples of varying thickness. Finally, from the slope of the plot of the inverse values of equilibrium current against the thicknesses of the samples used, the oxygen permeability (Dk) was calculated by multiplying the cell constant with the inverse value of the slope obtained from the latter plot. The unit for Dk is $10^{-11}(cm^2/sec)(ml\ O_2/ml\ mmHg)$.

Except where indicated, measurements were obtained in a buffer at 207 milliosmolals (mos). In these cases, the Dk data were converted to an isotonic buffer of 310 mos by use of the equation:

$$\log Dk_{310} = -0.0486(\log Dk_{207})^2 + 0.066 \log Dk_{207} - 0.0077$$

the % wet hydration data were converted to an isotonic buffer by the equation:

$$\text{Hydration}_{310} = 0.988 \text{Hydration}_{207}$$

and the % dry hydration data were converted to an isotonic buffer by the equation:

$$\text{Hydration}_{310} = 0.947 \text{Hydration}_{207}$$

Example 1

Table 1 illustrates the effect of variation of the hexafluoroisopropyl methacrylate (HFM) and 2-hydroxyethyl methacrylate contents (HEMA), with constant contents of N-Vinylpyrrolidone (NVP) and methacrylic acid (MA), on wet and dry hydration and permeability. Also included are related analysis of two samples containing no HFM and one sample of 100 wt. % HFM.

TABLE 1

| COMPOSITION, wt. % | | | | HYDRATION % | | | |
|---|---|---|---|---|---|---|---|
| HFM | HEMA | NVP | MA | WET[a] | DRY[a] | Dk[a] | REMARKS |
| 0.6 | 79.4 | 10 | 10 | 89 | 868 | 61 | All buttons |
| 1 | 79 | 10 | 10 | 91 | 1046 | 67 | were clear |
| 3 | 77 | 10 | 10 | 82 | 477 | 45 | |
| 4 | 76 | 10 | 10 | 81 | 438 | 44 | |
| 5 | 75 | 10 | 10 | 83 | 482 | 46 | |
| 0 | 100 | 0 | 0 | 31 | 43 | 9 | |
| 0 | 80 | 10 | 10 | 86 | 491 | 40 | |
| 100 | 0 | 0 | 0 | — | — | 17 | | a. Obtained at 207 mos. and converted to 310 mos.

Example 2

Table 2 indicates the effect of varying the HEMA and MA contents, with constant contents of HFM and NVP.

TABLE 2

| COMPOSITION, wt. % | | | | HYDRATION % | | | |
|---|---|---|---|---|---|---|---|
| HFM | HEMA | NVP | MA | WET[a] | DRY[a] | Dk[a] | REMARKS |
| 30 | 59 | 10 | 1 | 46 | 85 | 9 | Buttons had phase separation; after removal of top portion, hydrated discs were clear and homogeneous. |
| 30 | 57 | 10 | 3 | 58 | 136 | 21 | |
| 30 | 56 | 10 | 4 | 69 | 224 | 30 | |
| 30 | 52 | 10 | 8 | 76 | 310 | 28 | | a. Obtained at 207 mos. and converted to 310 mos.

Example 3

Table 3 illustrates the effect of varying the HEMA, NVP, and MA contents, with a constant content of HFM.

TABLE 3

| COMPOSITION, wt. % | | | | HYDRATION % | | | |
|---|---|---|---|---|---|---|---|
| HFM | HEMA | NVP | MA | WET[a] | DRY[a] | Dk[a] | REMARKS |
| 30 | 50 | 20 | 0 | 36 | 53 | 9 | All buttons had phase separation; after removal of the top portion, all hydrated discs were clear and homogeneous. |
| 30 | 45 | 15 | 10 | 82 | 463 | 51 | |
| 30 | 40 | 20 | 10 | 81 | 435 | — | |
| 30 | 35 | 25 | 10 | 85 | 587 | 50 | |
| 30 | 30 | 30 | 10 | 85 | 518 | 49 | | a. Obtained at 207 mos. and converted to 310 mos.

Example 4

Table 4 illustrates the effect of varying low content of HFM with varying contents of HEMA and MA at constant NVP content.

TABLE 4

| COMPOSITION, wt. % | | | | HYDRATION % | | | |
|---|---|---|---|---|---|---|---|
| HFM | HEMA | NVP | MA | WET[a] | DRY[a] | Dk[a] | REMARKS |
| 0.4 | 83.6 | 10 | 6 | 76 | 336 | 58 | All buttons were clear and homogeneous. |
| 0.6 | 83.4 | 10 | 6 | 77 | 341 | 48 | |
| 0.6 | 81.4 | 10 | 8 | 75 | 298 | 48 | |
| 0.8 | 83.2 | 10 | 6 | 71 | 242 | 52 | |
| 0.8 | 81.2 | 10 | 8 | 71 | 248 | 41 | |
| 1.0 | 83.0 | 10 | 6 | 77 | 337 | 48 | |
| 1.0 | 81.0 | 10 | 8 | 77 | 338 | 53 | |
| 1.2 | 82.8 | 10 | 6 | 72 | 252 | 38 | |
| 1.2 | 80.8 | 10 | 8 | 83 | 484 | 44 | | a. Obtained at 207 mos. and converted to 310 mos.

Example 5

Table 5 illustrates the effect of varying low content of PFS with varying contents of HEMA and MA at constant NVP content.

TABLE 5

| COMPOSITION, wt. % | | | | HYDRATION % | | | |
|---|---|---|---|---|---|---|---|
| HFM | HEMA | NVP | MA | WET[a] | DRY[a] | Dk[a] | REMARKS |
| 0.4 | 83.6 | 10 | 6 | 80 | 396 | 56 | All buttons were clear and homogeneous. |
| 0.6 | 83.4 | 10 | 6 | 71 | 254 | 59 | |
| 0.8 | 83.2 | 10 | 6 | 74 | 284 | 55 | |
| 1.0 | 83.0 | 10 | 6 | 73 | 300 | 56 | |
| 1.2 | 82.5 | 10 | 6 | 73 | 276 | 59 | |
| 2.0 | 80.0 | 10 | 8 | 78 | 351 | 59 | |
| 4.0 | 78.0 | 10 | 8 | 79 | 385 | 63 | | a. Obtained at 207 mos. and converted to 310 mos.

Example 6

Table 6 illustrates the effect of varying low content PFS with varying contents of HEMA, NVP, and MA. All measurements were obtained in a pH 7.3 buffer at 310 mos.

TABLE 6

| COMPOSITION, wt. % | | | | HYDRATION % | | | |
|---|---|---|---|---|---|---|---|
| PFS | HEMA | VP | MA | WET | DRY | Dk | REMARKS |
| 4 | 26 | 60 | 10 | 91 | 1035 | 80 | All rods were clear and colorless. After hydration, all discs were clear and colorless. |
| 4 | 16 | 70 | 10 | 93 | 1260 | 83 | |

Example 7

Table 7 illustrates the effect of adding a styrenic derivative, t-butyl styrene (tBS).

TABLE 7

| COMPOSITION, wt. % | | | | | HYDRATION % | | | |
|---|---|---|---|---|---|---|---|---|
| HFM | HEMA | NVP | MA | tBS | WET[a] | DRY[a] | Dk[a] | REMARKS |
| 30 | 45 | 10 | 10 | 5 | 69 | 316 | 36 | Buttons had phase separation; after removal of top portion hydrated discs were clear. |
| 30 | 40 | 10 | 10 | 10 | 53 | 113 | 18 | Bottom portion of phase separated buttons remained hazy after hydration. | a. Obtained at 207 mos. and converted to 310 mos.

Example 8

Table 8 illustrates the effect of adding a crosslinking agent, tetraethylene glycol dimethacrylate (TEGDM).

TABLE 8

| COMPOSITION, wt. % | | | | | HYDRATION % | | | |
|---|---|---|---|---|---|---|---|---|
| HFM | HEMA | NVP | MA | TEDGMA | WET[a] | DRY[a] | Dk[a] | REMARKS |
| 1 | 77.5 | 10 | 10 | 1.5 | 80 | 413 | 50 | All buttons were clear |
| 2 | 76.5 | 10 | 10 | 1.5 | 80 | 405 | 28 | and colorless. |
| 3 | 75.5 | 10 | 10 | 1.5 | 75 | 291 | 26 | All buttons were clear and colorless. |
| 30 | 44 | 10 | 15 | 1 | 82 | 449 | 42 | Buttons were slightly |
| 30 | 34 | 10 | 25 | 1 | 85 | 597 | 57 | hazy. | a. Obtained at 207 mos. and converted to 310 mos.

Example 9

Table 9 illustrates the effect of adding a strengthening monomer, methyl methacrylate (MMA), to the hydrogel.

TABLE 9

| COMPOSITION, wt. % | | | | | HYDRATION % | | | |
|---|---|---|---|---|---|---|---|---|
| HFM | HEMA | NVP | MA | MMA | WET[a] | DRY[a] | Dk[a] | REMARKS |
| 30 | 45 | 10 | 10 | 5 | 80 | 399 | 45 | Buttons had hazy |
| 30 | 40 | 10 | 10 | 10 | 84 | 526 | 34 | separation; after hydration, discs were clear. | a. Obtained at 207 mos. and converted to 310 mos.

Example 10

Table 10 illustrates the effect of variation of the pentafluorostyrene (PFS) and HEMA contents, with constant contents of NVP and MA.

TABLE 10

| COMPOSITION, wt. % | | | | HYDRATION % | | | |
|---|---|---|---|---|---|---|---|
| PFS | HEMA | NVP | MA | WET[a] | DRY[a] | Dk[a] | REMARKS |
| 0.4 | 79.6 | 10 | 10 | 91 | 1170 | 66 | All buttons |
| 0.6 | 79.4 | 10 | 10 | 91 | 1257 | 63 | were clear; |
| 1.8 | 78.2 | 10 | 10 | 86 | 647 | 66 | after hydration, |
| 2 | 78 | 10 | 10 | 91 | 1162 | 71 | the discs were |
| 5 | 75 | 10 | 10 | 81 | 428 | 45 | found to be |
| 10 | 70 | 10 | 10 | 80 | 395 | 42 | strong. |
| 15 | 65 | 10 | 10 | 78 | 349 | 39 | |

TABLE 10-continued

| COMPOSITION, wt. % | | | | HYDRATION % | | | |
|---|---|---|---|---|---|---|---|
| PFS | HEMA | NVP | MA | WET[a] | DRY[a] | Dk[a] | REMARKS |
| 20 | 60 | 10 | 10 | 81 | 422 | 33 | |
| 25 | 55 | 10 | 10 | 76 | 318 | 41 | |
| 30 | 50 | 10 | 10 | 72 | 242 | 31 | | a. Obtained at 207 mos. and converted to 310 mos.

Example 11

Table 11 illustrates the effect of combining different compositions of PFS and HFM, with varying content of HEMA and constant contents of NVP and MA.

TABLE 11

| COMPOSITION, wt. % | | | | | HYDRATION % | | | |
|---|---|---|---|---|---|---|---|---|
| HFM | PFS | HEMA | NVP | MA | WET[a] | DRY[a] | Dk[a] | REMARKS |
| 1.0 | 10 | 69.0 | 10 | 10 | 79 | 374 | 45 | All buttons were clear; |
| 1.0 | 5 | 74.0 | 10 | 10 | 81 | 448 | 42 | after hydration, the |
| 1.5 | 5 | 73.5 | 10 | 10 | 76 | 311 | 56 | discs were found to be strong. |
| 1.0 | 2.5 | 76.5 | 10 | 10 | 81 | 427 | 65 | |
| 2.0 | 25 | 53 | 10 | 10 | 69 | 218 | 37 | |
| 4.0 | 25 | 51 | 10 | 10 | 69 | 203 | 28 | | a. Obtained at 207 mos. and converted to 310 mos.

Example 12

The use of a fluorosulfonamide monomer of 2-(N-ethylperfluorosulfonamido ethyl acrylate) (FX-13 by 3M Co.) is illustrated in Table 12.

TABLE 12

| COMPOSITION, wt. % | | | | HYDRATION % | | | |
|---|---|---|---|---|---|---|---|
| FX-13 | HEMA | VP | MA | WET[a] | DRY[a] | Dk[a] | REMARKS |
| 0.2 | 79.8 | 10 | 10 | 85 | 578 | 72 | Buttons were clear: after hydration, the discs were clear. | a. Obtained at 207 mos. and converted to 310 mos.

Example 13

The use of a ultraviolet absorber (UV) of 2-hydroxy-4-(2-hydroxy-3-methacryloxy) proporybenzophenone (Permasorb MA, National Starch and Chemical Corp.) in Conjunction with PFS, HEMA, NVP and MA is illustrated in Table 13.

TABLE 13

| COMPOSITION, wt. % | | | | | HYDRATION % | | | |
|---|---|---|---|---|---|---|---|---|
| PFS | HEMA | NVP | MA | UV | WET[a] | DRY[a] | Dk[a] | REMARKS |
| 1.5 | 78.3 | 10 | 10 | 0.2 | 89 | 847 | 73 | All buttons were clear. After hydration, all discs were clear. | a. Obtained at 207 mos. and converted to 310 mos.

Example 14

Table 14 illustrates the use of a sulfonate monomer in its salt form as an added hydrophilic agent. In a typical procedure, HEMA, NVP and PFS, were weighed into a beaker. Into this mixture sulfoethyl methacrylate (SEM) was weighed accurately followed by equal molar concentration of triethanolamine (TEA). After adding the required amount of initiator, the contents of the beaker were gently stirred for thorough mixing, with cooling.

TABLE 14

| COMPOSITION, wt. % | | | | | HYDRATION % | | | |
|---|---|---|---|---|---|---|---|---|
| HFM | HEMA | NVP | SEM | TEA | WET[a] | DRY[a] | Dk[a] | REMARKS |
| 4 | 71.0 | 10 | 8.5 | 6.5 | 64 | 177 | 31 | All buttons were clear |
| 4 | 66.0 | 10 | 11.3 | 8.7 | 75 | 308 | 52 | and yellow when dry; after |
| 4 | 63.5 | 10 | 12.7 | 9.8 | 75 | 294 | 57 | hydration the discs |
| 4 | 61.0 | 10 | 14.1 | 10.9 | 76 | 323 | 46 | became colorless. | a. Obtained at 207 mos. and converted to 310 mos.

Example 15

Table 15 illustrates the use of p-fluorostyrene (pFS) as the fluoromonomer in conjunction with HEMA, NVP, and MA.

TABLE 15

| COMPOSITION, wt. % | | | | HYDRATION % | | | |
|---|---|---|---|---|---|---|---|
| PFS | HEMA | NVP | MA | WET[a] | DRY[a] | Dk[a] | REMARKS |
| 1 | 79 | 10 | 10 | 87 | 729 | 66 | The hydrated |
| 5 | 75 | 10 | 10 | 81 | 417 | 48 | discs were |
| 10 | 70 | 10 | 10 | 85 | 419 | 49 | clear but had |
| 15 | 65 | 10 | 10 | 67 | 206 | 26 | less drape and |
| 20 | 60 | 10 | 10 | 69 | 224 | 21 | less elasticity. | a. Obtained at 207 mos. and converted to 310 mos.

Example 16

Table 16 illustrates the use of glycerol as a solvent for the polymerization of PFS, HEMA, NVP, and MA. All reactions were thermally initiated with VAZO-52. The total monomer concentration was 85 wt. % and the glycerol concentration was 15 wt. %. Polymerization could be done in a stationary state or under spin casting conditions.

TABLE 16

| COMPOSITION, wt. % | | | | HYDRATION % | | | |
|---|---|---|---|---|---|---|---|
| PFS | HEMA | NVP | MA | WET[a] | DRY[a] | Dk[a] | REMARKS |
| 2 | 78 | 10 | 10 | 81 | 438 | 43 | Buttons be- |
| 4 | 78 | 10 | 8 | 79 | 382 | 48 | came opaque |

TABLE 16-continued

| COMPOSITION, wt. % | | | | HYDRATION % | | | |
|---|---|---|---|---|---|---|---|
| PFS | HEMA | NVP | MA | WET[a] | DRY[a] | Dk[a] | REMARKS |
| 25 | 55 | 10 | 10 | 66 | 200 | 29 | after polymerization, |

TABLE 16-continued

| COMPOSITION, wt. % | | | | HYDRATION % | | | |
|---|---|---|---|---|---|---|---|
| PFS | HEMA | NVP | MA | WET[a] | DRY[a] | Dk[a] | REMARKS |
| | | | | | | | but discs turned clear in buffer solution. | a. Obtained at 207 mos. and converted to 310 mos.

Example 17

Table 17 illustrates the use of glycerol as a solvent for the polymerization of PFS, HEMA, NVP, and the potassium salt of 3-sulfopropyl methacrylate (SPM). Reactions were initiated either thermally with VAZO-52 or by uv using benzoin methyl ether as the photoinitiator. The total monomer concentrations were varied as indicated in the Table.

TABLE 17

| COMPOSITION, wt. % | | | | | | HYDRATION % | | | |
|---|---|---|---|---|---|---|---|---|---|
| | | | | Monomer | Glycerol | | | | |
| PFS | HEMA | NVP | SPM | wt. % | wt. % | WET[a] | DRY[a] | Dk[a] | REMARKS |
| 4 | 81 | 10 | 5 | 85[b] | 15 | 52 | 109 | 30 | All discs were clear. |
| 4 | 76 | 10 | 10 | 85[b] | 15 | 68 | 206 | 47 | |
| 4 | 76 | 10 | 10 | 85[b] | 15 | 78 | 364 | 56 | |
| 4 | 66 | 10 | 20 | 80 | 20 | 80 | 402 | 57 | | a. Obtained at 207 mos. and converted to 310 mos.
b. uv photopolymerization

Example 18

Table 18 illustrates the use of constant PFS with constant SEM.TEA as a function of increasing NVP and decreasing HEMA. All measurements were obtasined in a pH 7.3 buffer at 310 mos.

TABLE 18

| COMPOSITION, wt. % | | | | | HYDRATION % | | | |
|---|---|---|---|---|---|---|---|---|
| HFM | HEMA | NVP | SEM | TEA | WET | DRY | Dk | REMARKS |
| 15 | 27.3 | 40 | 10 | 7.7 | 68 | 211 | 42 | All rods were clear and |
| 15 | 17.3 | 50 | 10 | 7.7 | 76 | 309 | 47 | slightly yellow. |
| 20 | 22.3 | 40 | 10 | 7.7 | 67 | 206 | 29 | After hydration of discs, |
| 20 | 12.3 | 50 | 10 | 7.7 | 69 | 225 | 42 | all samples were clear and |
| 25 | 17.3 | 40 | 10 | 7.7 | 63 | 172 | 37 | colorless. |
| 10 | 37.5 | 30 | 12.7 | 9.8 | 76 | 316 | 55 | |
| 10 | 27.5 | 40 | 12.7 | 9.8 | 82 | 452 | 43 | |
| 10 | 17.5 | 50 | 12.7 | 9.8 | 88 | 711 | 70 | |
| 15 | 32.5 | 30 | 12.7 | 9.8 | 74 | 287 | 43 | |
| 15 | 22.5 | 40 | 12.7 | 9.8 | 79 | 376 | 49 | |
| 15 | 12.5 | 50 | 12.7 | 9.8 | 83 | 479 | 63 | |
| 20 | 17.5 | 40 | 12.7 | 9.8 | 75 | 306 | 51 | |
| 25 | 2.5 | 50 | 12.7 | 9.8 | 68 | 216 | 37 | |
| 15 | 29.6 | 20 | 20 | 15.4 | 83 | 475 | 59 | |
| 15 | 24.6 | 25 | 20 | 15.4 | 84 | 538 | 66 | |
| 15 | 19.6 | 30 | 20 | 15.4 | 87 | 672 | 66 | |

Example 19

Table 19 illustrates the use of glycerol as a solvent for the polymerization of pentafluorobenzyl methacrylate (PFMB), HEMA, NVP, and SPM. Reactions were initiated either thermally with VA70-52 or by uv using benzoin methyl ether as the photoinitiator.

TABLE 19

| COMPOSITION, wt. % | | | | Monomer wt. % | Glycerol wt. % | HYDRATION % | | Dk[a] | REMARKS |
|---|---|---|---|---|---|---|---|---|---|
| PFBM | HEMA | NVP | SPM | | | WET[a] | DRY[a] | | |
| 4 | 74 | 10 | 12 | 85 | 15 | 75 | — | 49 | All buttons were clear, |
| 4 | 73 | 10 | 13 | 85 | 15 | 80 | — | 54 | as were discs after |
| 4 | 72 | 10 | 14 | 85[b] | 15 | 77 | — | 53 | after hydration. |
| 4 | 66 | 10 | 20 | 80[b] | 20 | 83 | 512 | 69 | |
| 4 | 71 | 10 | 15 | 85[b] | 15 | 81 | 422 | 59 | | a. Obtained at 207 mos. and converted to 310 mos.
b. uv photopolymerization

Example 20

Table 20 illustrates the polymerization of PFBM, HEMA, NVP, and SEM.TEA. All reactions were photoinitiated using benzoin methyl ether as the photoinitiator, either in the presence or absence of glycerol.

TABLE 20

| COMPOSITION, wt. % | | | | | Monomer wt. % | Glycerol wt. % | HYDRATION % | | Dk[a] | REMARKS |
|---|---|---|---|---|---|---|---|---|---|---|
| PFBM | HEMA | NVP | SEM | TEA | | | WET[a] | DRY[a] | | |
| 4 | 73.4 | 10 | 6 | 4.6 | 85 | 15 | 65 | 179 | 35 | All buttons were clear as were |
| 4 | 63.5 | 10 | 12.7 | 9.8 | 100 | — | 81 | — | 54 | discs after hydration. |

Example 21

This example illustrates the effect of protein absorption. An artificial tear solution was prepared:

| | |
|---|---|
| Albumin | 0.788 g |
| Lysozyme | 0.430 g |
| -Globulin | 0.270 g |
| Mucin | 0.400 g |
| Calcium Chloride | 0.008 g | in 200 ml of an isotonic buffer.

The hydrogel discs including fluorinated and non-fluorinated lens materials were soaked in the artificial tear solution at 35° C. for two weeks. With fluorinated lens materials containing from 0.2 to 25 wt. % fluoromonomer in accordance with this invention, substantially less surface deposits were noted as compared to the non-fluorinated hydrogel lens materials, with the higher content fluoro material appearing to have less deposit formation. In addition, all fluoropolymer materials were readily cleaned by running water, a circumstance which was not possible with the non-fluorinated polymers. With the use of an enzyme cleaner, the surface deposits were also removed.

While specific embodiments of the invention have been shown and described, many modifications and variations are possible. For example, while bulk polymerization of materials in rod or button form has been described it is possible to use conventional contact lens molding techniques such as cast molding and spin cast molding to directly form finished or near finished contact lenses. Thus, the need for optically grinding lens surface and rear portions can be avoided by using such casting techniques. When spin casting by conventional techniques, polymerization can be carried out in a solvent such as glycerol often used in amounts of from 5 to 30 wt. % and preferably 15 wt. % with standard spin casting procedures. When contact lenses are to be made from the materials of this invention, buttons previously bulk polymerized can be ground to have optical front and rear surfaces by conventional, grinding and lathing operations known to the contact lens art. The useful materials of this invention, when formed into contact lenses, have high strength, i.e., tear strength is at least as high as commonly existing commercial hydrogel contact lenses. In fact tear strength, tensile strength and modulus of elasticity are at least equivalent to generally acceptable commercial hydrogel contact lenses.

I claim:

1. A clear hydrogel lens polymeric material having good surface resistance, high tensile and tear strength, high oxygen permeability, good optical clarity and consisting essentially of the free radical polymerization product of (a) about 7 to about 25.0 parts by weight of a fluorine-containing monomer, (b) about 2.5 to about 81.0 parts by weight of a material selected from the group consisting of mono- or di-hydroxyalkyl or alkylene oxide acrylates or methacrylates, (c) about 10 to about 50.0 parts by weight of an N-vinyl lactam, and (d) about 5 to about 35.4 percent by weight of added unsaturated sulfonic acid monomers or salts thereof, said product having a Dk value of from at least 35 at 35° C. and a wet water of hydration of at least 30 percent.

2. A hydrogel lens material in accordance with claim 1 and further comprising (e) about 0 to about 7 percent by weight of a crosslinking agent, and (f) 0–2 percent by weight of a ultraviolet absorbing monomer or polymer, said material having a Dk value of at least 35 at 35° C.

3. A polymeric material according to claim 2 wherein component (a) is a fluorine containing acrylate or methacrylate having the following formula:

Fluoroacrylates and Fluoromethacrylates

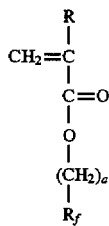

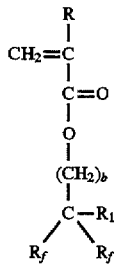

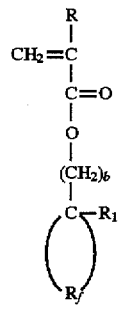

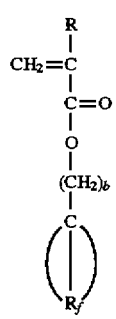

where R is selected from the group consisting of hydrogen, methyl, fluoro and trifluoromethyl groups, "a" is an integer from 1–4, "b" is an integer from 0 to 4, $R_1$ is selected from the group consisting of hydrogen, methyl, fluoro and trifluoromethyl groups, and $R_f$ is selected from the group consisting of a straight or branched fluoroalkyl group, fluoroaryl group or fluoroarylene group having 1–24 fluorine atoms.

4. A polymeric material according to claim 1 wherein component (a) is a fluorine-containing styrenic monomer having the formula:

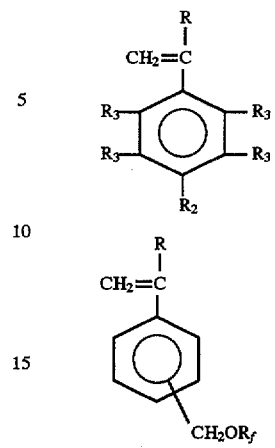

where R is selected from the group consisting of hydrogen, methyl, fluoro and trifluoromethyl groups, and $R_f$ is selected from the group consisting of a straight or branched fluoroalkyl group, fluoroaryl group or fluoroarylene group having 1–24 fluorine atoms, and $R_2$ is selected from the group consisting of fluoro and $R_f$ groups, and $R_3$ is selected from the group consisting of hydrogen and fluoro groups.

5. A polymeric material according to claim 1 wherein component (a) is a fluorine-containing perfluoroether macromer having the formula:

where "b" and "c" are integers from 1 to 150, and $R_4$ is a substituent containing a polymerizable double bond.

6. A polymeric material according to claim 1 wherein component (a) is a fluorine-containing sulfonamide monomer having the structure:

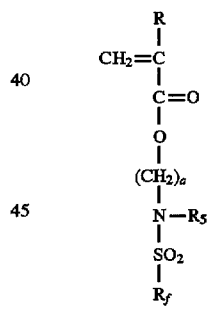

where R is selected from the group consisting of hydrogen, methyl, fluoro and trifluoromethyl groups, $R_f$ is selected from the group consisting of a straight or branched fluoroalkyl group, fluoroaryl group or fluoroarylene group having 1–24 fluorine atoms, and "a" is an integer from 1–4, and $R_5$ is selected from the class of hydrogen, alkyl or aryl substituents.

7. A polymeric material according to claim 1 wherein component (b) is selected from the group consisting of 2-hydroxyethyl acrylate and methacrylate, 2-hydroxypropyl acrylate and methacrylate, 2,3-dihydroxypropyl acrylate and methacrylate, 3-hydroxypropyl acrylate and methacrylate and diethyleneglycol monoacrylate and monomethacrylate to polyethylene glycol monoacrylate and methacrylate.

8. A polymeric material according to claim 1 wherein component (c) is N-vinylpyrrolidone.

9. A polymeric material according to claim 1 wherein component (c) is N-vinyl acetamide.

10. A polymeric material according to claim 1 wherein component (d) is the triethanolammonium salt of 2-methacryloyloxyethane sulfonic acid.

11. A polymeric material according to claim 1 wherein component (d) is selected from the group consisting of unsaturated sulfonic acid containing monomers of vinyl sulfonic acid, 2-acrylamido-2-methylpropanesulfonic acid, 2-methacryloyloxyethanesulfonicacid, styrenesulfonic acid and allysulfonic acid.

12. A polymeric material according to claim 2 wherein component (e) is a polyfunctional derivative of a material selected from the group consisting of acrylic or methacrylic acid, acrylamide or methacrylamide, multi-vinyl substituted benzenes, and Bisphenol A.

13. A polymeric material according to claim 2 wherein (a) is pentafluorostyrene, (b) is 2-hydroxyethyl methacrylate, (c) is N-vinylpyrrolidone, and (d) is the triethanolammonium salt of 2-methacryloyloxyethane sulfonic acid.

14. A polymeric material according to claim 13 wherein component (f) is a monomeric or polymeric benzophenone or benzotriazole.

15. A lens material according to claim 1 that is obtained through free radical bulk polymerization.

16. A lens material according to claim 1 that is obtained through solution polymerization in glycerol solvent.

17. An optically clear hydrophilic lens having good surface resistance, high tensile and tear strength, high oxygen permeability, good optical clarity and consisting essentially of the free radical polymerization product of (a) about 7 to about 25.0 parts by weight of a fluorine-containing monomer, (b) about 2.5 to about 81.0 parts by weight of a material selected from the group consisting of mono- or di-hydroxyalkyl or alkylene oxide, acrylates or methacrylates, (c) about 10 to about 50 parts by weight of an N-vinyl lactam, and (d) about 5 to about 35.4 percent by weight of added unsaturated sulfonic acid or salts thereof, said product having a Dk value of at least 35 at 35° C. and a wet water of hydration of at least 30 percent.

18. A hydrophilic lens in accordance with claim 17 and further comprising, (e) about 0 to about 7 percent by weight of added hydrophilic monomers, (e) about 0 to about 7 percent by weight of a crosslinking agent, and (f) 0–2 percent by weight of an ultraviolet absorbing monomer or polymer, said lens having a wet water of hydration of at least 30 percent.

19. An optically clear hydrophilic contact lens in accordance with claim 17 and further comprising said fluorine-containing monomer being pentafluorostyrene and said N-vinyl lactam being N-vinylpyrrolidone.

20. An optically clear hydrophilic lens in accordance with claim 17 wherein (a) is pentafluorostyrene, (b) is 2-hydroxyethyl methacrylate, (c) is N-vinylpyrrolidone, and (d) is the triethanolammonium salt of 2-methacryloyloxyethane sulfonic acid.

21. An optically clear hydrophilic lens in accordance with claim 17 wherein (a) is pentafluorobenzyl methacrylate, (b) is 2-hydroxyethyl methacrylate, (c) is N-vinylpyrrolidone, and (d) is the triethanolammonium salt of 2-methacryloyloxyethane sulfonic acid.

22. An optically clear hydrogel lens material in accordance with claim 2 wherein said fluorine-containing monomer is pentafluorostyrene.

23. An optically clear hydrogel lens material in accordance with claim 2 wherein said fluorine-containing monomer is pentafluorobenzyl methacrylate.

24. An optically clear hydrogel lens material in accordance with claim 2 wherein said N-vinyl lactam is N-vinylpyrrolidone.

25. A polymeric material according to claim 2 wherein (a) is pentafluorobenzyl methacrylate, (b) is 2-hydroxyetholmethacrylate, (c) is N-vinylpyrrolidone, and (d) is the triethanolammonium salt of 2-methacryloyloxyethane sulfonic acid.

26. An optically clear hydrophilic lens in accordance with claim 17 wherein (a) is pentafluorostyrene, (b) is 2-hydroxyethyl methacrylate, (c) is N-vinylpyrrolidone, and (d) is an inorganic salt of sulfonic acid.

27. An optically clear hydrophilic lens in accordance with claim 17 wherein (a) is pentafluorobenzyl methacrylate, (b) is 2-hydroxyethyl methacrylate, (c) is N-vinylpyrrolidone, and (d) is an inorganic salt of sulfonic acid.

28. An optically clear hydrophilic lens in accordance with claim 17 wherein (a) is pentafluorostyrene, (b) is 2-hydroxyethyl methacrylate, (c) is N-vinylpyrrolidone, and (d) is the potassium salt of 3-sulfopropyl methacrylate.

* * * * *